Patented May 9, 1933

1,907,820

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

PROCESS OF PRODUCING HYDROGENATED AMINES

No Drawing. Original application filed January 23, 1928, Serial No. 248,979. Divided and this application filed April 1, 1929. Serial No. 351,825.

This invention relates to the catalytic reduction and hydrogenation of organic nitrocompounds to hydrogenated amines, in the liquid or vapor phase with or without pressure at room or elevated temperatures.

According to the present invention organic nitrocompounds are reduced and hydrogenated by means of reducing gases of all kinds such as hydrogen gases containing hydrogen, water gas, etc., with or without the presence of ethylene, methane, carbon dioxide, water vapors, nitrogen and the like. In fact any of the ordinary reducing gases may be used. The contact masses used in the present invention contain base exchange bodies or their derivatives. Under the term "base exchange body" are included all natural or artificial bodies which possess the properties of exchanging their bases for other bases of salt solutions. The base exchanging products used in making catalytic compositions of the present invention or as initial material for derivaties to be so used may possess high base exchanging power or in many cases may possess lower base exchanging power, since the catalytic value of the final compositions is not primarily dependent on the amount of base exchanging power present. In general the base exchange bodies may be divided into three main categories:—Two-component and multi-component zeolites, i. e., base exchange bodies containing chemically combined silicon in their nucleus and non-silicious base exchange bodies in which all of the silicon is replaced by other suitable acidic or amphoteric metal oxides. Two-components zeolites are the reaction products of two types of initial components, that is to say, metallates and silicates, (using the term metallate in a somewhat broader sense as will be defined further on in the description), or metal salts and silicates. Frequently more than one member of a type may enter into reaction, that is to say, a silicate may react with more than one metallates or more than one metal salt. The multi-component zeolites are the reaction products of at least three types of components, that is to say, at least one silicate, at least one metallate, and at least one metal salt.

The base exchange bodies, both zeolites and non-silicious base exchange bodies, may be associated with diluents preferably in the form of a physically homogeneous structure, as will be described below. Either diluted or undiluted base exchange bodies may be present in the contact masses used in the present invention, or their derivatives may be present, but it should be understood that wherever base exchange bodies are referred to both diluted and undiluted products are included.

Base exchange bodies, both zeolites and non-silicious base exchange bodies, may also be transformed into derivatives which possess many of the chemical and most of the physical characteristics of the parent base exchange bodies. Such derivatives may be salt-like bodies, that is to say, the reaction products of base exchange bodies with compounds containing anions capable of reacting with the base exchange bodies to form products which possess many of the properties of salts. A further class of derivatives are the acid leached base exchange bodies. When a base exchange body is subjected to leaching by acids, particularly dilute mineral acids, the exchangeable bases are first gradually removed. The resulting products contain both the more basic and the more acidic components of the non-exchangeable nucleus of the base exchange body, with or without a portion of the exchangeable bases. As the leaching is carried on further, more and more of the relatively positive components of the non-exchangeable nucleus are removed, and if carried to completion the leached product contains only the relatively acid components of the non-exchangeable nucleus. In the case of zeolites the final product from long continued leaching is a complex silicic acid which has many of the physical properties of the original base exchange body. In the description and claims the class of base exchange bodies and their derivatives will be referred to by the generic term "permutogenetic" products.

Catalytically active components may be associated with diluted or undiluted permutogenetic bodies in four main forms, as follows:—(1) They may be physically admixed with or impregnated into the permutogenetic products. (2) They may be physically homogeneously incorporated into the permutogenetic products before the latter have been completely formed in the form of catalytically active diluent bodies or in the form of diluents which have been impregnated with catalytically active substances. (3) They may be chemically combined with or in the permutogenetic products in non-exchangeable form, that is to say, they may form a part of the non-exchangeable nucleus of the base exchange body present in the final contact mass or which is transformed into the derivatives, or they may be chemically combined with the base exchange bodies in the form of catalytically active anions which form with the base exchange body salt-like bodies. (4) They may be chemically combined in exchangeable form either during the formation of the base exchange body or by base exchange after formation. Obviously of course the same or different catalytically active components may be present in more than one of the above described forms, and it is an advantage of the present invention that catalytically active substances may be introduced in a wide variety of forms which gives a large field of choice to the catalytic chemist.

While the different permutogenetic products may vary widely in their chemical characteristics, they all possess a similar physical structure which is characterized by more or less high porosity, frequently microporosity, and great resistance to high temperatures, and in the case of products which have not been acid leached to the point of removal of catalytically active components these components are distributed throughout the framework of the products in atomic or molecular dispersion, as will be described in greater detail below, and this chemical homogeneity is one of the important advantages of some of the contact masses of the present invention.

While three of the methods of combination of the catalytically active substances may be effected with undiluted as well as diluted permutogenetic products, it has been found that for most reactions homogeneously diluted permutogenetic contact masses are of advantage, particularly where the diluents are of a physical nature such as to exert a desired influence on a catalytic activity of the contact masses, as when, for example, diluents are rich in silica, which has been found to have an activating power, or where the diluents by reason of high porosity, capillarity. or surface energy may be considered as physical catalysts or activators.

Base exchange bodies used in contact masses of the present invention behave as if they were products of extremely high molecular weight for catalytically active components can be introduced either into the non-exchangeable nucleus or in the form of exchangeable bases in practically any desirable proportions and the ordinary law of chemical combining proportions, which in compounds of low molecular weight restricts the proportions in which components can be incorporated chemically, appears to be without force, which makes it reasonable to assume that the molecular weight is so high as to completely mask the effect of the law. It is of course possible that the base exchange bodies, or some of them, may be solid solutions of a plurality of related compounds of lower molecular weight. It has not been possible hitherto to definitely settle this question, as base exchange bodies are not readily capable of structural chemical analysis. The present invention is of course not limited to any theory, but irrespective of the underlying reasons the fact that catalytically active components may be chemically introduced in any desired proportions is of enormous importance to the catalytic chemist and gives him the power to produce an almost unlimited number of finely and gradually toned catalysts or contact masses for the various reductions and hydrogenations of organic nitrogen compounds. In all cases the contact masses produced are highly effective by reason of the desirable physical structure of the permutogenetic products contained therein and the wide limits of homogeneous dilution of catalytically active molecules or atoms with resulting uniformity and smoothness of action, which is of great importance, particularly in the sensitive reactions such as the reduction of many aromatic nitrocompounds in the vapor phase, a field of reduction catalyses of organic nitrogen compounds for which contact masses used in the present invention are peculiarly adapted.

In addition to the important characteristics with which permutogenetic products endow the contact masses of the present invention it has been found that for many of the reactions coming within the scope of the present invention it is desirable to stabilize the contact masses, and this may be effected by associating with the permutogenetic products or incorporating or forming therein compounds of the alkali forming metals, that is to say, alkali metals and the alkaline earth metals. These compounds appear to slow up or smooth out the catalytic reaction, and will be referred to throughout this specification as stabilizers. While for some reactions strongly alkaline stabilizers are not harmful, it has been found that for many reactions it is important to provide non-alkaline stabilizers, such as for example, the salts or compounds of alkali forming metals which do not possess an alkaline reaction. It is a great advantage of the present invention that in the normal formation of base exchange bodies alkali forming metal oxides are present as exchangeable bases, and whether used without acid treatment or treated with acid, they form stabilizers which are combined in or associated with the resulting permutogenetic products in an extremely fine state of division in which the stabilizers are peculiarly active. Thus base exchange bodies containing alkali forming metal exchangeable bases may be considered as complex stabilizers.

In addition to the use of stabilizers which are important in a large number of reductions and hydrogenations included in the scope of the present invention, it has been found that the stabilizer action and the overall efficiency of the contact masses can in many cases be greatly increased or enhanced with the association therewith or chemical combination therein of elements or radicals or groups which are catalytically active but do not possess specific catalytic activity for the particular reaction to be carried out. Thus for example in the case of a hydrogenation reaction, certain catalysts which at the temperatures used in the reaction behave as dehydrogenation catalysts may be added to enhance and tone the catalytic activity of the catalysts or the operation of the stabilizers. Similarly in some cases oxidation catalysts, such as those containing metal elements of the fifth and sixth groups of the periodic system may greatly improve the effectiveness of the contact mass used, especially where it is desirable to produce intermediate products which in some cases are relatively unstable. Some other reduction reactions involve the splitting off of water or in some cases the splitting off of carbon dioxide, and may also involve molecular condensations. In such reactions it is very desirable to incorporate catalysts or catalytic components which are not specific reduction catalysts but which may favor dehydration, splitting off of carbon dioxide or condensation. Such catalysts or catalytic components which are not specific catalysts for the reaction in which they are being used under the reaction conditions obtaining will be referred to throughout the specification as stabilizer promoters, as they appear to enhance the toning effect which can be achieved by stabilizers. The use of this expression should, however, in no sense be taken to limit the invention to a particular theory of action of these non-specific catalysts and in fact in some cases stabilizer promoters may be present where there are not stabilizers.

The tremendous range of chemical groups which may be combined in or with or incorporated in permutogenetic products permits a wide choice of stabilizer promoters as well as specific catalysts and permits their association with the contact masses in an extremely homogeneous and catalytically efficient form. Thus many base exchange bodes or their derivatives may be considered as complex catalysts, stabilizers and stabilizer promoters, as all of these elements may be present in the same chemical compound and sharing the advantages flowing from its desirable physical structure and chemical properties. Of course both stabilizer and stabilizer promoters may be mixed partly or wholly with permutogenetic products and a single stabilizer or single stabilizer promoter may be present partly in physical admixture and partly in chemical combination, as will be clear to the skilled base exchange chemist.

The base exchange bodies which form the important components or initial material for derivatives in contact masses of the present invention may be prepared in any of the well known methods. Thus for example, two-component zeolites may be prepared by wet methods in which the metallate components or metal salt components, part or all of which may be catalytically active, are caused to react with soluble silicates to form zeolites of alumino silicate or aluminum double silicate types, or the components may be fused, preferably in the presence of fluxes. It should be understood that under the term metallate is included not only the alkaline solutions of amphoteric metal oxides or hydroxides but also alkali forming metal salts of metal acids, such as the oxyacids of metals of the fifth and sixth groups, which in at least one stage of oxidation are not strictly speaking amphoteric, but which products are capable of reacting with silicates to form zeolites, or with other components to form non-silicious base exchange bodies. Throughout the specification this somewhat more general definition of metallates will be strictly adhered to. In the formation of two-component zeolites by wet methods, the final reaction product must be alkaline to litmus, and for products of high base exchanging power it should be neutral or alkaline to phenolphthalein. For the purpose of producing base exchange bodies to be used in the preparation of contact masses of the present invention it is sometimes unnecessary to provide high base exchanging power, and for many purposes zeolites formed under conditions resulting in a final reaction which is acid to phenolphthalein but alkaline to litmus are of advantage. It is not definitely known whether products produced under such circumstances are homogeneous chemical compounds, although in many ways they behave as such. There is, however, reason to believe that in some cases at least mixtures of base exchanging and non-base exchanging polysilicates may be produced. For the purpose of the present specification a product will be considered as a base exchange product if it has any base exchange power at all.

It is desirable for many purposes and particularly where two-component zeolites of high base exchanging power are needed to add the relatively acid components, for example, metal salts in the case of aluminum double silicate type of silicates, to the relatively more alkaline components such as for example soluble silicates. By these means a continuous alkalinity is insured, and this method may be considered as the preferred method in most cases, but the opposite procedure is advantageous for certain contact masses and is included in the invention.

Multi-component zeolites may be prepared by any of the foregoing methods using at least three types of components, that is to say, at least one metallate, at least one metal salt and at least one soluble silicate. In the case of multi-component zeolites, as in the case of two-component zeolites, the conditions of alkalinity should be observed, and for many purposes it is advantageous to add the relatively acid components to the relatively alkaline components, in order to insure continuous alkaline reaction. The multi-component zeolites produced vary in their nature, dependent on the proportion of the different reacting components. Thus where the metallates and silicates predominate over the metal salts the resulting products resemble the alumino silicate type of two-component zeolites. If the metal salts and silicates predominate over the metallates the products resemble the aluminum double silicate type of two-component zeolites, and finally if the metallates and metal salts predominate over the silicates the resulting product resembles more or less non-silicious base exchange bodies. It will be clear that there is no sharp defining line between the three types of multi-component zeolites, and one shades into the other as the proportions of the different components vary. It is an advantage of the multi-component zeolites over the two-component zeolites that the choice of catalytically active components is wider, as some catalytically active elements or groups can only be incorporated in the form of metallates and others only in the form of metal salts. In a multi-component zeolite each catalytically active group can be incorporated in the form in which it is best available.

Non-silicious base exchange bodies are produced by the general methods described above, but instead of bringing about reactions between silicates and other metal oxide components, two or more oxymetal compounds are caused to react, in general, at least one will be a metallate and at least one a metal salt, or in some cases it is possible to bring about action between two different metallates in which one negative radical is more acidic than the other. It is possible to produce non-silicious base exchange bodies in which a plurality of metal oxides are present. It is also possible to produce non-silicious base exchange bodies in which a single metal is present. Thus for example, some metals may be sufficiently amphoteric in character to form both metallates and metal salts which are capable of reacting with each other to produce base exchange bodies.

A special method of producing non-silicious base exchange bodies consists in the gradual neutralization of strongly alkaline salts of the oxyacids of metal elements of the fifth and sixth groups in stages of oxidation in which they are sufficiently amphoteric. The neutralization of other strongly alkaline metallates may also bring about formation of non-silicious base exchange bodies. The converse method, whereby non-alkaline salts of suitable metals are gradually treated with alkali until the reaction is sufficiently alkaline to permit the formation of base exchange bodies, may also be used.

Many metals are capable of entering into the base exchange formation only in certain stages of oxidation, and it is sometimes necessary to introduce such metals in a stage of oxidation different from that desired in the final base exchange body, the change of stage of oxidation being preferably effected during the formation of the base exchange body. Certain other elements may be incorporated in the form of complex compounds of the most various types, such as for example, ammonia complexes and the like.

In addition to the artificial base exchange bodies briefly described above, natural base exchange bodies, such as nepheline, leucite, felspar, and the like, may be used.

The most important contact masses for many reactions contain permutogenetic products, in which preferably the diluents are homogeneously incorporated into the base exchange bodies before formation of the latter, or at least before the base exchange body has set after formation. Many diluents, either inert, stabilizing, activating, catalytically active, or having stabilizer promoter effects, can be used. A few of the diluents will be briefly enumerated:—kieselguhrs of all kinds, particularly natural or treated "Celite" earth, silicious powders of various types, powdered permutogenetic products, natural or artificial powders of rocks, stones, tuffs, trass, lava, and similarly volcanic products which are frequently highly porous, greensand, glauconite or its acid leached derivative glaucosil, pulverized slag wool, cements, sand, silica gel, pulverized earthenware, fuller's earth, talc, glass powder, pumice meal, asbestos, graphite, activated carbon, quartz meal, various pulverized minerals rich in quartz, metal powders and metal alloy powders, salts of oxymetal acids such as tungstates, vanadates, chromates, uranates, manganates, cerates, molybdates, etc., particularly copper salts of the above, silicates, such as copper silicate, iron silicate, nickel silicate, cobalt silicate, aluminum silicate, titanium silicate, minerals or ores, especially those rich in copper, etc. Finely divided diluents are of great advantage, especially when the average particle size is less than 60 microns, in which case the diluents possess high surface energy, which increases the adsorptive and absorptive capacity of the contact mass, the diffusion speed and porosity. These finely divided diluents may be considered as physical catalysts or activators. Diluted permutogenetic bodies may also be finely divided and used as part or all of the diluents of other base exchange bodies.

The following nine methods are the most effective for the introduction of diluents, but any other suitable methods can be used. Examples of methods for incorporating diluents are described in detail in the co-pending application of Jaeger and Bertsch, Serial No. 95,771, which is now Patent No. 1,840,450, issued January 12, 1932, filed March 18, 1926, and any of the methods described can be used in incorporating diluents in the present invention:

(1) The diluents may be mixed with one or more liquid components of the base exchange bodies to be formed when the latter are prepared by wet methods.

(2) Components, either catalytically active, stabilizer promoters, or others, may be precipitated or impregnated into diluent bodies which are then incorporated into the base exchange bodies by any suitable methods of incorporation.

(3) Diluents may be mixed with base exchange bodies when the latter are still in the form of gels, by kneading or stirring, in which case the base exchange gel behaves as an adhesive. The homogeneity and uniformity of the distribution of the diluents is of course not quite so great by this method as by Method (1), but for many catalytic reduction and hydrogenations involving organic nitrogen compounds extreme uniformity is not essential.

(4) Diluents may be formed during the formation of base exchange bodies by mixing suitable compounds with the components of the base exchange bodies so that the diluent particles are precipitated during formation. Protective colloids may be added to prevent coagulation of the diluent particles before the base exchange bodies have become sufficiently set.

(5) Compounds may be added which react with certain of the base exchange bodies forming components to produce diluents, for instance salts of the metal acids of the fifth and sixth groups may be added in sufficient excess so that they react with components of the base exchange body to form insoluble diluents, as for example with heavy metal oxides.

(6) Preformed base exchange bodies, diluted or undiluted, artificial or natural, can be impregnated with true or colloidal solutions of catalytically effective components and then dried.

(7) A preformed base exchange body, diluted or undiluted, may be impregnated with a plurality of solutions which react therein to precipitate any desired diluents.

(8) Soluble diluent compounds may be added to the components forming a base exchange body, which after formation retains the compounds in solution and is dried without washing or is treated to precipitate the compounds.

(9) Natural base exchange bodies or artificial base exchange bodies, diluted or undiluted, or their derivatives, may be impregnated with solutions of the desired compounds, which are then precipitated by means of reactive gases.

The nucleus or non-exchangeable portion of the molecules of the base exchange bodies is ordinarily considered to consist of two types of oxides, namely, relatively basic metal oxides, usually amphoteric, and relatively acidic oxides, such as $SiO_2$, some amphoteric metal oxides and some metal oxides which have a distinctly acid character. The nucleus behaves as a single anion and cannot be split by ordinary chemical means, but it is advantageous to consider the two portions of the nucleus as the basic and acidic portions, bearing in mind of course that the nucleus behaves as a single group. The metal compounds which are capable of forming the basic portion of the nucleus are those of the following metals:—copper, silver, gold, bismuth, beryllium, zinc, cadmium, boron, aluminum, some rare earths, titanium, zirconium, tin, lead, thorium, niobium, antimony, tantalum, chromium, molybdenum, tungsten, uranium, vanadium, manganese, iron, nickel, cobalt, platinum, palladium. Compounds of these elements may be introduced singly or in mixtures, in any desired proportions, and may be in the form of simple or complex ions. It should be understood that some of the elements in certain stages of oxidation may be introduced either as metallates or metal salts. Others may be introduced in only one form, and still others may be introduced in a stage of oxidation other than that desired in the final base exchange body or in the form of complex compounds. Among the complex ionogens are ammonia, hydrocyanic acid, oxalic acid, formic acid, tartaric acid, citric acid, glycerine, and the like.

Many of the metals are specific catalysts, others are stabilizers, and still others are stabilizer promoters. Naturally the status of an element as catalyst or stabilizer promoter will vary with the particular reduction on hydrogenation reaction for which the final contact mass is to be used, and the choice of catalysts and stabilizer promoters together with the proportions will be determined by the particular catalytic reduction or hydrogenation of the particular organic nitrogen compound for which the contact mass is to be used.

Examples of components forming the relatively acid portion of the base exchange nucleus are alkali metal silicates, which are soluble in alkali, and alkali metal salts of acids, such as those of boron, phosphorous, nitrogen, tin, titanium, vanadium, tungsten, chromium, niobium, tantalum, uranium, antimony, manganese, etc.

The exchangeable bases of the base exchange bodies may be substituted by base exchange, and the elements which can be introduced singly or in admixture by base exchange are the following:—copper, silver, gold, ammonia, beryllium, calcium, manganese, caesium, potassium, sodium, zinc, strontium, cadmium, barium, lead, aluminum, scandium, titanium, zirconium, tin, antimony, thorium, vanadium, lithium, rubidium, thallium, bismuth, chromium, uranium, manganese, iron, cobalt, nickel, ruthenium, palladium, platinum and cerium.

Depending on the reactions in which the contact mass is to be used, the exchangeable bases introduced may be specific catalysts, they may be stabilizers, or they may be stabilizer promoters. They may be introduced as simple ions or as complex ions, and may enhance the catalytic activity of the final contact mass, improve its physical structure, or both.

As has been described above, base exchange bodies can be caused to react with compounds containing acidic radicals capable of forming therewith salt-like bodies. The radicals may be present in the form of simple acid radicals, polyacid radicals or complex acid radicals, and include radicals containing the following elements:—chromium, vanadium, tungsten, uranium, molybdenum, manganese, tantalum, niobium, antimony, selenium, tellurium, phosphorus, bismuth, tin, chlorine, platinum, boron. Among the complex radicals are ferro and ferricyanogen, certain ammonia complexes and the like. The amount of acid radicals caused to unite with the base exchange bodies to form salt-like bodies may be varied so that the resulting products may possess the character of acid, neutral or basic salts. Most of these acid radicals are stabilizers or stabilizer promoters for the catalytic reduction and hydrogenation of organic nitrocompounds.

The base exchange bodies diluted or undiluted, or some of their salt like body derivatives, may be treated with acids, such as mineral acids, for example, 2-10% sulfuric, hydrochloric or nitric acids, to remove part or all of the exchangeable bases, or also part or all of the basic portion of the nucleus.

In the case of zeolites, the partial leaching with acid, which leaves part or all of the basic portion of the nucleus or even part of the exchangeable bases, does not affect the function of the zeolites as catalysts when they contain catalytically active elements in the basic portion of the nucleus, or in some cases even exchangeable bases, and such partially leached catalysts are of great importance in many reactions. Where the leaching is carried out to completion the advantageous physical structure remains to a considerable extent the same, but the remainder is of course a form of silica, or in the case of zeolites in which part of the silica is replaced by other acidic compounds, a mixture of the two, and usually will not be a specific catalyst for the reduction or hydrogenation of organic nitrogen compounds. It serves, however, as an advantageous physical carrier of specific catalysts, and in the case of partially substituted zeolites may also contain stabilizer promoters.

Leached non-silicious base exchange bodies, either partially or completely leached, may contain catalytically active components and behave as catalysts, stabilizer promoters or both, and many important catalysts for the reduction and hydrogenation of organic nitrogen compounds are thus obtained. This is particularly the case for reactions where a relatively alkali-free contact mass is required for best results and where the alkaline content of a contact mass containing a base exchange body may be too great for optimum results.

Base exchange bodies or their derivatives, diluted or undiluted, may also be coated in the form of films on massive carrier granules or may be impregnated therein. The massive carriers may be inert, activating, or themselves catalysts. For example, certain catalytic metal alloys, minerals, especially copper minerals, fall within this class. Aluminum or copper alloy granules perform an additional advantageous function in that their relatively high heat conductivity tends to prevent local overheating in highly exothermic reductions or hydrogenations or organic nitrogen compounds which is of considerable importance in obtaining good yields, as many of the reactions, particularly hydrogenations, are equilibrium reactions, and at higher temperatures hydrogenation catalysts reverse their function and tend to favor dehydrogenation with resulting lowering of yields and contamination of the product.

The contact masses of the present invention may be used for all types of liquid and vapor phase reductions and hydrogenations or organic nitrogen compounds. They are particularly suitable for the reduction of aromatic nitrocompounds to the corresponding hydrogenated amines. Among the specific reactions for which the present invention is well suited, a few illustrative examples are the reduction of aromatic nitrocompounds to the hydrogenated amino compounds. Thus for example, nitrobenzene under suitable reaction conditions can be reduced to hydrogenated amines, such as cyclohexylamine, dicyclohexylamine and cyclohexylaniline. Substituted aromatic nitrocompounds may be similarly reduced to the corresponding reduction and hydrogenation products. Examples of such products are nitrotoluols, nitroxylols, substituted nitrobenzols, nitrotoluols and the like. Other aromatic nitrocompounds of importance are alphanitronaphthalene.

The reactions, particularly in the vapor phase, may be carried out with reducing gases, such as hydrogen, gases containing hydrogen, such as water gas, carbon monoxide with or without steam, and the like. In the case of water gas and carbon monoxide, the CO is partly oxidized to $CO_2$. It is desirable to maintain the temperature in vapor phase reactions sufficiently high so that the nitrogen compounds do not condense out, and the wide choice of finely toned catalysts which is given by the present invention is of great importance for the reduction or hydrogenation of organic nitrogen compounds, which because of their high vaporizing temperature, must be reduced under relatively uniform reaction conditions, for as is well known, high temperatures tend to reverse the equilibrium of reaction. The reaction may be carried out at atmospheric pressure, or above or below atmosphere. Pressures above atmospheric are preferably used in the presence of steam.

The vapor phase reductions of nitro compounds to the corresponding amines are preferably carried out at temperatures between 180–250° C., but by the choice of a suitable catalyst and when a large excess of hydrogen is used the reactions may also be carried out at much higher temperatures, for examples 300–350° C. In many cases with the highly efficient contact masses of the present invention yields of 98% of the theory and better may be obtained, and the purity of the reaction products is extremely high in most cases. Some permutogenetic contact masses withstand high temperature very effectively, and possess a high resistance to recrystallization and poisoning, and the life of the contact masses is very long, an important feature in reduction processes. In some cases, particularly with highly diluted contact masses, the mechanical strength may be somewhat deficient, and in such cases it may be desirable to wash the permutogenetic body after drying with a soluble silicate to effect surface silicification.

Many of the reactions may be carried out by a single passage over the contact mass, but other reactions are preferably carried out in a circulating process in which the gases are continuously recirculated with suitable means for removing products of reaction. In such circulating processes very large excesses of hydrogen can be used and are favorable. The excess of hydrogen may in many cases amount to ten times or more the theoretical amount required.

As the contact masses of the present invention permit a tremendous field of choice of stabilizer promoters, many reactions which involve not only reduction or hydrogenation may also involve the splitting off of water or carbon dioxide or other reactions, can be carried out with great effectiveness with contact masses of the present invention in which suitable stabilizer promoters are present having a catalytic activity for the splitting off of water or carbon dioxide or for condensation or other reactions. For certain other reactions, particularly where the reduction is to proceed to an intermediate product of relatively unstable character stabilizer promoters which are oxidation or dehydrogenation catalysts under the reaction conditions may effectively tone the contact masses so as to permit a very accurate and fine control of reaction.

While an enormous variety of contact masses containing the most various catalysts can be prepared under the principles of the present invention, the most effective contact masses for many reactions, particularly the reduction of the aromatic nitrocompounds to the corresponding amines are those containing permutogenetic products having associated therewith or chemically combined therein or therewith one or more of the elements, copper, tin, silver, nickel, iron, cobalt, or zinc. These contact masses are especially effective when they contain stabilizer promoters such as dehydrogenation catalysts, water splitting catalysts or oxidation catalysts.

180–250° C. is a suitable temperature for the reduction of aromatic nitrocompounds with hydrogen or hydrogen-containing gases to the corresponding amines without hydrogenation of the aromatic nucleus, especially when highly effective contact masses are used which contain silver, copper or tin as the main reduction catalytic components. In some cases higher temperatures may be used, up to about 340° C., especially when a large excess of reducing gases is used. When the contact masses contain iron, nickel or cobalt as the main effective reduction catalytic components reductions should be carried out at somewhat lower temperature to prevent the formation of a large amount of by-products.

Practically all contact mass compositions used in the present invention should be subjected to preliminary treatment with reducing gases in order to increase their reactivity for the reduction of hydrogenation or organic nitrogen compounds. This preliminary treatment and the catalytic reductions themselves produce secondary chemical changes in the contact mass composition, particularly at the surface, and may change the chemical character of the permutogenetic products present, although usually the advantageous physical structure seems to remain unaffected. For this reason the contact masses will be referred to as of the time they are freshly prepared, as is customary in catalytic chemical nomenclature. It is an advantage of contact masses of the present invention that in many cases a much higher loading per volume of contact mass is possible than in the case of contact masses used hitherto. The normal loading is about 50–80 parts by weight per 1,000 corresponding parts by volume per day, but with many of the contact mass compositions of the present invention, including some described in the specific example which will follow, an overloading up to 50% and more can be used without affecting the purity of products and without seriously diminishing the life of the contact masses. These important increases in efficiency can be obtained with particular ease in converters which do not allow accumulation of heat to any appreciable extent in the contact layers. Such examples are those of the automatic heat exchange type, as described in my co-pending application, Serial No. 234,660, filed Nov. 21, 1927. It should be understood of course that the reduction or hydrogenation of organic nitrogen compounds in this type of converter is not claimed broadly in this application, which is limited to processes using contact masses containing permutogenetic bodies.

When converters with effective temperature control are used in conjunction with recirculation, the flow or reducing gases may be kept at a very moderate figure. Thus for example in many cases the circulation of 1 to 3 times the contact mass space per hour is entirely sufficient. When the loadings are increased, however, the flow must be suitably adjusted in order to prevent heat accumulations which may reverse the action of the catalysts.

Not only is the efficiency of the contact masses of the present invention superior to those which have been used hitherto, but the production period of plant operation with the same contact masses is also very high, and in many cases plants using contact masses of the present invention may be run for six to eight months without deterioration of the efficiency of the contact mass.

When contact masses of the present invention finally show deterioration by reason of poisoning due either to poisons in the organic nitrogen compounds or in the reducing gases used, they can be regenerated directly in the converters by treating them with oxygen-containing gases, the oxygen-containing gases being gradually increased at first, the temperature being maintained at 250–450° C. After uniform oxidation of the contact mass has been obtained, it can be reduced with reducing gases at 220–320° C.

The reduction of many organic nitrogen compounds and particularly the reduction of aromatic nitrocompounds may result in products contaminated with certain by-products which decrease their value. The formation of by-products can to a large extent be avoided by using a very high ratio of reducing gas to compound reduced. Thus the ratio may be about 1:10, although of course higher or lower ratios are advantageous. For very sensitive reactions, especially when the contact mass used is highly active, ratios as high as 1 part of compound to 30–50 parts of reducing gases may be desirable, particularly in circulatory processes.

While many of the contact masses of the present invention are of particular importance for vapor phase reductions and hydrogenations of organic nitrogen compounds, with or without pressure, many of them are highly active in liquid phase reduction with or without pressure or in reductions which take place in suspension. The following specific examples will describe a number of typical contact masses according to the present invention, together with reaction conditions for representative reductions or hydrogenations of organic nitrogen compounds. The example is an illustration only, and the invention is in no sense limited to the details therein set forth.

*Example*

A tin or copper base exchange body containing tin or copper in non-exchangeable form is prepared as follows: 40–50 parts of $SiO_2$ in the form of a commercial waterglass solution are diluted with 4 to 5 times its weight of water. 75 parts of aluminum nitrate containing 9 mols of water are precipitated with 20% ammonia solution, and the resulting aluminum hydroxide is transformed into corresponding sodium aluminate by means of 2 N sodium hydroxide solution. 50 parts of pumice meal are incorporated in the waterglass solution, and the aluminate is then added. A 20% solution of $SnCl_2$ containing 2 mols of water is prepared and added to the aluminate-waterglass mixture until the reaction is slightly alkaline to phenolphthalein. A gel is formed, which is filtered and washed. The $SnCl_2$ solution may be substituted by a corresponding amount of a 20% copper nitrate solution.

The product obtained is a so-called three-component zeolite which contains in non-exchangeable form aluminum and tin or aluminum and copper, and constitutes an excellent contact mass for the catalytic reduction of aromatic nitrocompounds to the corresponding amines. The effectiveness of the contact mass can be still further improved by sucking and washing until the wash water gives no test for chlorine, and then incorporating in the following non-silicious base exchange body as a diluent.

10.2 parts of $Al_2O_3$ in the form of freshly precipitated aluminum hydroxide are dissolved in a solution containing 40 parts of 100% KOH in 200 parts of water. The zeolite body described above is incorporated in this solution and a 10% water solution containing 44.4 parts of aluminum sulfate with 18 mols of water is added to the aluminate mixture with vigorous agitation. If desired a corresponding amount of titanium sulfate, zirconium nitrate, zinc nitrate, thorium nitrate, nickel nitrate, or a mixture, are substituted for the aluminum sulfate. The reaction product obtained is a non-silicious aluminum base exchange body which is not a specific catalyst for the reduction reaction, but is diluted with a catalytically active three-component zeolite and forms a well toned contact mass for the catalytic reduction and hydrogenation of aromatic nitrocompounds such as nitrobenzene.

The reaction product is sucked, pressed and thoroughly washed with water, dried and broken into fragments. The fragments may be treated with 2 to 5% copper nitrate solution to partly replace the alkali in the exchangeable portion of the base exchange body. Cobalt nitrate, iron nitrate, nickel nitrate, alone or in admixture, may partly or wholly replace the copper nitrate. The products may also be treated with salts of the oxymetal acids of the fifth and sixth groups of the periodic system, such as acids of vanadium, tungsten, molybdenum, tantalum, chromium or uranium. For example, a 1% ammonium vanadate solution may be used, and in all cases a so-called salt like body is formed after the soluble components have been washed out.

In the contact masses described in this example the non-silicious aluminum base exchange body may be considered as a complex stabilizer for the catalyst, and includes stabilizer promotors. The stabilizer action may be still further toned by the addition of other stabilizer promoters, such as the silicates of the heavy metals, such as copper, titanium, manganese, zirconium, cerium, thorium, and the light metals, such as beryllium, calcium, magnesium and barium. One or more of the silicates above mentioned may be added, and they may be advantageously formed in situ. The amount of stabilizer promoter depends on the particular catalytic reduction for which the contact mass is to be used, but in general from 2 to 5% of such stabilizer promoters give good results. Instead of forming the stabilizer promoters in situ they may of course also be introduced in the same manner as any other diluent.

A further method of introducing stabilizer promoters consists in substituting part or all of the metal salt component of the base exchange body with corresponding amounts of a 5-10% solution of beryllium nitrate, zirconium nitrate, thorium nitrate, or aluminum nitrate. The catalytic efficiency of the mass may also be enhanced by the introduction of catalytically effective elements by base exchange, using for example 5 to 10% solutions of copper nitrate, silver nitrate, tin chloride, nickel nitrate, iron nitrate, etc., singly or in admixture, the choice of salt solution depending on the particular reduction for which the contact mass is to be used.

Instead of embedding the catalytically active base exchange body in a catalytically inactive non-silicious base exchange body it may be embedded in well known diluted or undiluted base exchanging polysilicates or natural neutral polysilicates or artificial neutral polysilicates. Base exchanging aluminum, cadmium, titanium, zirconium, silver, copper and nickel, two- or three-component polysilicates or zeolites are well suited for this purpose. In the case of products containing silver, copper or nickel, they may be considered as additional catalytically effective components.

If large amounts of nickel, cobalt or iron, or mixtures of them, are used as components for the preparation of such contact masses the aromatic nitrocompounds are not only reduced to the corresponding aminocompounds but in many cases are further hydrogenated. Thus nitrobenzene is not only reduced to aniline, but undergoes further reduction to cyclohexylamine, dicyclohexylamine and cyclohexylaniline. The proportions of these reaction products obtained will depend on the reaction temperature and the amount of hydrogen used. At low temperatures, such as 180-200° C., the main product is aniline, while at higher temperatures, such as 220-270° C., hydrogenated aminocompounds are the main reaction products. A suitable excess of reducing gases may be used, which may be 5-15 times the theoretical amount necessary for the reduction and hydrogenation to be carried out.

In the claims the term "permutogenetic" covers base exchange bodies, silicious or non-silicious, the products obtained by the acid leaching of these base exchange bodies and the salt-like bodies obtained by the reaction of these base exchange bodies with compounds the acid radicals of which are capable of reacting with the base exchange bodies to produce products which show most of the properties of salts. When used in the claims, the term "permutogenetic" will have no other meaning.

This application is a division of my prior application 248,979, which is now Patent No.

1,845,280, issued February 16, 1932, filed January 23, 1928.

What is claimed as new is:

1. A method of producing hydrogenated primary aromatic amines which comprises vaporizing aromatic nitrocompounds and causing the vapors to react with an excess of hydrogen-containing gases at temperatures materially above 200° C. in the presence of a contact mass containing a permutogenetic body.

2. A method of producing hydrogenated primary aromatic amines which comprises vaporizing aromatic nitrocompounds and causing the vapors to react with an excess of hydrogen-containing gases at temperatures materially above 200° C. in the presence of a contact mass containing a diluted permutogenetic body.

3. A method of producing hydrogenated primary mononuclear amines of the benzene series which comprises vaporizing the corresponding nitrocompounds of the benzene series and causing the vapors to react with an excess of hydrogen-containing gases in the presence of a contact mass containing at least one permutogenetic body at a temperature above 200° C. to produce hydrogenation of the nucleus as well as reduction of the nitro group.

4. A method of producing hydrogenated primary mononuclear amines of the benzene series which comprises vaporizing the corresponding nitrocompounds of the benzene series and causing the vapors to react with an excess of hydrogen-containing gases in the presence of a contact mass containing at least one diluted permutogenetic body at a temperature above 200° C. to produce hydrogenation of the nucleus as well as reduction of the nitro group.

5. A method of producing hydrogenated aniline which comprises vaporizing nitrobenzene admixing the vapors with an excess of hydrogen-containing gas and passing the mixture over a contact mass containing at least one permutogenetic body at a temperature above 200° C. to effect hydrogenation as well as reduction.

6. A method of producing hydrogenated aniline which comprises vaporizing nitrobenzene admixing the vapors with an excess of hydrogen-containing gas and passing the mixture over a contact mass containing at least one diluted permutogenetic body at a temperature above 200° C. to effect hydrogenation as well as reduction.

7. A method according to claim 3 in which at least one of the catalytically active components is present in the permutogenetic body in non-exchangeable form.

8. A method according to claim 5 in which at least one of the catalytically active components is present in the permutogenetic body in non-exchangeable form.

Signed at Pittsburgh, Pennsylvania, this 28th day of March, 1929.

ALPHONS O. JAEGER.